J. LOUDON, Jr.
Attaching Hubs to Axles.
No. 1,365. Patented Oct. 12, 1839.
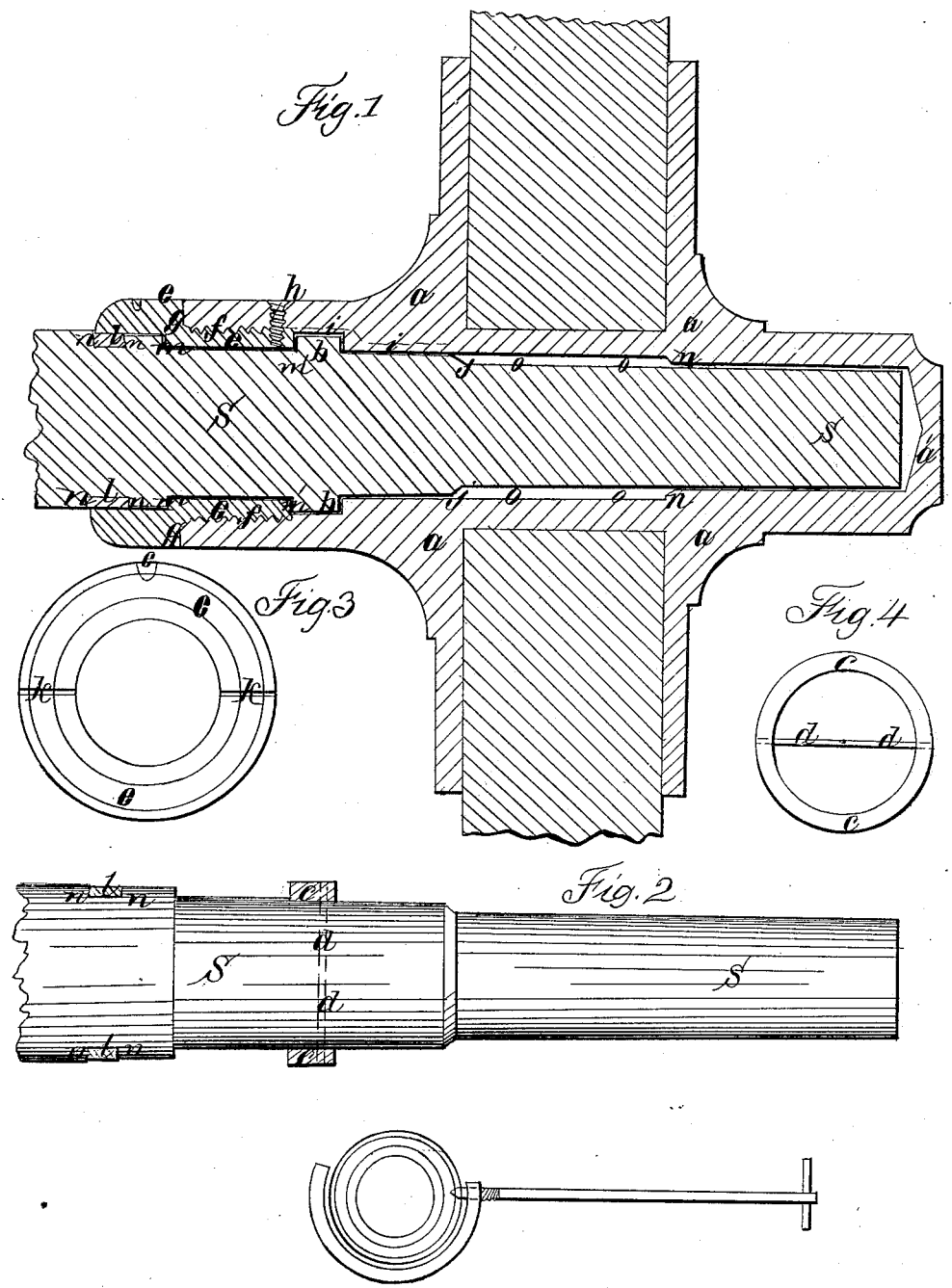

UNITED STATES PATENT OFFICE.

JOHN LOUDON, JR., OF AUBURN, NEW YORK.

MODE OF ATTACHING THE HUBS OR NAVES OF CARRIAGE-WHEELS TO THE AXLES THEREOF.

Specification of Letters Patent No. 1,365, dated October 12, 1839.

*To all whom it may concern:*

Be it known that I, JOHN LOUDON, Jr., of Auburn, in the county of Cayuga and State of New York, have invented a new and Improved Mode of Attaching the Hubs or Naves of Carriage-Wheels to the Axles Thereof; and I do hereby declare that the following is a full and exact description thereof.

I make the hubs, or naves, of my wheels of cast iron or of any other suitable metal, and bore out the cavity which is to form the box for the reception of the arm of the axle from the inner end thereof, leaving the outer end solid in that part where the nuts and caps which confine the axles and boxes together are usually applied, the screw collar, or cap, which I employ for that purpose being situated at the inner end of the hub.

Figure 1, in the accompanying drawings, represents a longitudinal section through the hub and axle, exhibiting likewise the mode of securing them together. $a, a$, is the hub, or nave, its outer end $d'$, being solid; $s, s$ is the arm of the axle inserted therein. The axle is turned cylindrical from its outer end to the point $j, j$, where there is an offset of an eighth of an inch, more or less, the axle being enlarged from the point $j$, to the projecting collar, or fillet, $b, b$, the office of which will presently appear. A female screw is cut in the inner end of the hub, as shown at $f, f$, and to this is fitted the screw collar $e, e$, which is made of brass, or other suitable metal. The interior of the screw collar $e, e$, fits closely into a recess $m, m$, turned in the arm of the axle. The end $m'$, of this recess constitutes one side of the fillet $b, b$. When the screw collar $e, e$, is in place, its inner end $m'$, bears against $b, b$, and forces its opposite side against a shoulder in the hub, or box, as shown in the drawing, and at the same time a shoulder $g$, on the screw collar $e$, comes up to its bearing on the hind end of the hub.

To retain the oil in place with which the axles are lubricated, a recess $n, n$, is turned in it, and receives a ring, or packing, of leather, or other elastic material, which is embraced by the rear end of the screw collar $e, e$. In order to insert this collar, it has to be divided, so as to form two semi-collars, as represented by the lines $k, k$, Fig. 3, which is an end view of said collar. The screws should be cut right and left handed on the collar and boxes of opposite hubs, and to more securely to confine the collars in place a screw $h$, is inserted into them through the hub, or box. The hole which receives the screw serves also to form a passage for the supply of oil, there being a channel formed in the hub, and represented by the dotted lines $i, i$, which leads into the oil chamber, or cavity, $o, o$, made by the reduction of the size of the axle at the offset $j, j$, and extending to $p, p$. The screw collar $e, e$, may be inserted in place, without dividing it into two parts, by making the fillet marked $b, b$, in Fig. 1, in the form of a ferrule, which may be slipped on to the axle and confined in place by pins, or screws, and it is so represented in Fig. 2, where it is marked $c, c$, the dotted lines $d, d$, representing a pin passing through it, and through the axle, by which it is confined in place, after passing the screw collar $e, e$, over the axle from its outer end. Instead of the pins $d, d$, screws may be employed; and in other respects the apparatus is constructed in the manner already fully described.

Fig. 4, represents an end view of the ferrule $c, c$, with the wire $d, d$, passing through it. This mode of construction although sometimes used by me, is not preferred.

Having thus fully described the nature of my invention, and the manner in which the same is carried into operation, I do hereby declare that what I claim, and desire to secure by Letters Patent, is—

1. The within described manner of employing the screw collar $e, e$, by dividing the same into two parts and inserting it by means of a male screw cut thereon, into the inner end of the hub, or box, provided with a female screw for that purpose, the inner portion of said screw collar fitting into a recess in the axle prepared to receive it, and its outer end bearing against the collar, or fillet, $b, b$, and confining the whole together, as set forth.

2. I claim also the combination of the screw collar $e, e$, when not divided into two parts, with the movable ferrule $c, c$, to be attached to the axle by pins, or screws, said collar screwing into the hub, and being in other respects constructed and applied substantially as herein described.

3. I also claim the inserting of the packing in the recess $n, n$, under the rear end of the collar.

JOHN LOUDON, JR.

Witnesses:
WARREN WILDER,
ALONZO MELLEN.